United States Patent Office 3,387,856
Patented June 11, 1968

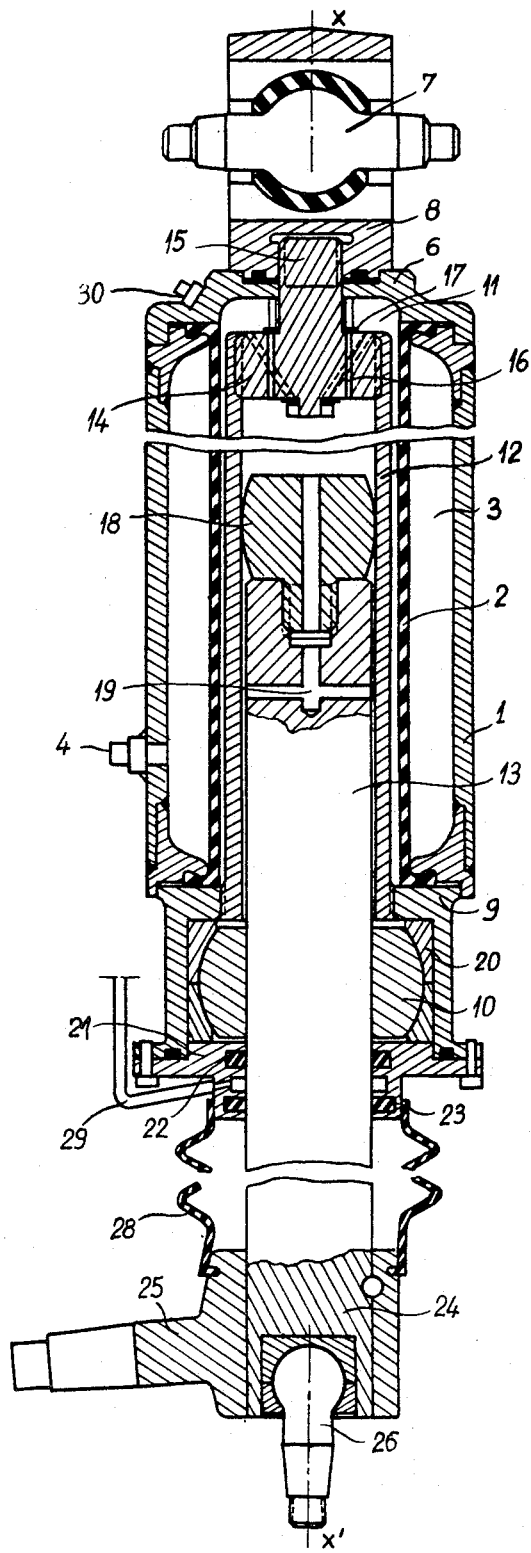
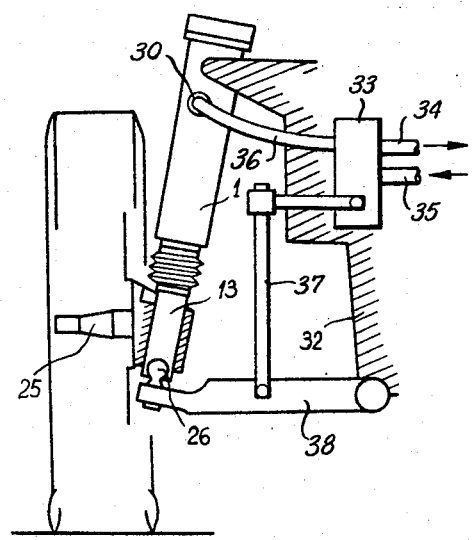
Fig-1
Fig-2
Inventors
Louis Guilhamat
Francois Mounier-Poulat
Stevens, Davis, Miller & Mosher
Attorneys

3,387,856
HYDRO-PNEUMATIC SUSPENSION SYSTEMS
Louis Guilhamat and Francois Mounier-Poulat, Lyon,
France, assignors to Automobiles M. Berliet, Lyon,
France, a corporation of France
Filed Sept. 9, 1965, Ser. No. 486,089
Claims priority, application France, Sept. 24, 1964,
989,208, Patent 1,418,898
6 Claims. (Cl. 280—96.2)

ABSTRACT OF THE DISCLOSURE

A hydro-pneumatic shock absorber suspension device for interconnecting sprung and unsprung portions of vehicles, the device including an outer cylinder having a cylindrical diaphragm disposed therein and defining therewith a first chamber. A cylindrical liner is disposed within the diaphragm, forms a working cylinder, and defines with the diaphragm a second chamber. Compressed gas is put in the first chamber and oil in the second, and throttling means are provided which connect the interior of the working cylinder with the second chamber. A piston is guided in the working cylinder and has a curved peripheral portion coacting with the inner surface of said liner.

---

The suspension systems of vehicles, notably heavy automotive vehicles such as trucks, comprise as a rule a resilient assembly, generally in the form of leaf springs, and a shock-absorbing device of mechanical or hydraulic type associated if desired with so-called trim correctors if they are of the automatic type, or with backlash adjustment means if they are of the manual type.

Conventional systems are attended by elaborate linkage or connection problems concerning either the transmission of acceleration or braking forces to the vehicle frame, or the transverse stability of the vehicles.

Various attempts have already ben made with a view to assemble or combine in a same device the suspension, damping and/or connecting members, and possibly the trim correctors.

However, these attempts led up to now only to partial results, in that they provided mostly the combination of two types of devices, for example the suspension and damping devices, or the suspension and connecting devices, or the damping and connecting devices.

This invention is concerned with a device constituting at the same time the suspension, shock-absorbing and connecting or linkage members, this device being adapted to be associated with an automatic trim corrector. It consists of a piston and cylinder unit acting as a hydro-pneumatic reservoir, the cylinder being provided at its ends with members for connecting same on the one hand to the sprung portions and on the other hand to the unsprung portions of the vehicle. These connecting members may consist of ball-and-socket joints, elastic swivel means or more or less rigid fittings.

The piston rod may be utilized as a wheel stub axle. In this case the stub axle is fitted on the piston rod so as to transmit the wheel reactions thereto. In all cases the mounting of the lower bearing and the specific configuration of the piston head permit the deformation of the piston rod while affording proper frictional working conditions of this rod and avoiding high pressures localized on bearing edges. Moreover, the hydro-dynamic conditions obtaining between the piston head and the liner are constantly attended by a satisfactory lubrication.

The advantageous features characterizing this invention will appear more clearly as the following description proceeds with reference to the accompanying drawings in which:

FIGURE 1 illustrates diagrammatically in vertical axial section a typical form of embodiment of the invention, and FIGURE 2 is a mounting diagram wherein the piston rod is used as a front-wheel stub axle.

Referring to the drawings it will be seen that the device of this invention consists of a cylinder body 1 in which a tubular diaphragm 2 is mounted concentrically in order to provide a chamber 3 in which a gas under pressure introduced through a valve 4 is enclosed. The cylinder 1 is closed at its top by a cover 6 in which a mounting swivel joint 7 is mounted by means of a strap 8, and at its lower end by a hollow cylindrical plug 9 constituting a case for receiving a part-spherical joint member 10. Within the cylinder the diaphragm 2 provides an oil-filled chamber 11 containing a tube or liner 12 in which the piston 13 is slidably mounted. The upper end of this liner 12 is rigid with a damping piston 14 of which the rod 15 is secured to the cover 6 and formed in the conventional manner with adequate small-sectioned orifices 16, and is provided with thin resiliently deformable washers 17; the piston head consists of a barrel-shaped member 18 of which the peripheral surface of revolution adapted to revolve about the main axis X—X′ of the device is for example toroidal so as to constitute a ball member and bear with the minimum surface on the inner wall of liner 12 of which the inner diameter is slightly greater than the diameter of piston 13; an internal duct 19 permits the flow of lubricating oil within the liner 12 on either side of the piston head 18.

The piston 13 has an extension projecting from the liner 12 through the hollow cylindrical plug 9 in which it is housed by means of the ball member 10, the outer peripheral surface of this member 10 engaging corresponding bearing members 20, as shown.

The piston also extends through the flanged lid 21 of plug 9, the fluid tightness between these members being provided by piston packings 22, 23, and the free end 24 of the piston is adapted to receive for example a keyed or tightly fitted stub axle member or support 25, or a member for connecting the device to a wheel hub, front-axle or rear-axle assembly, or to any other unsprung portion of the vehicle. If the piston is fitted in a stub-axle member or support, a fastening ball-member 26 is mounted in the lower end of the piston. An elastic bellows 28 protects the free end of the piston while permitting its free sliding movements in the cylinder.

Should the packing 22 fail from reliably protecting the device against oil leakages, these may be recovered by forming in the lid 21 a suitable groove connected to a pipe line 29 to return this leakage oil to the reservoir. This pipe line 29 may be secured on the flanged lid 21 and in this case the scraper packing 23 will prevent the oil from leaking into the bellows 28; alternately, the oil leakage may be recovered from the bellows proper.

At its upper portion the cylinder is provided with an oil filler nipple 30 which may also be used as a union for connecting a pipe line leading from the hydro-pneumatic suspension device to a hydraulic slide valve controlled manually or automatically as a function of the distance between the wheels and the vehicle frame, to connect the inner space of the suspension device either with a high-pressure oil source or with a reservoir at the atmospheric pressure, whereby the trim of the vehicle may be adjusted continuously and automatically, this arrangement permitting if desired of adjusting under the same conditions the ground clearance of the vehicle.

This hydraulic valve is shown by the reference numeral 33 in FIG. 2, and controls a source of hydraulic pressure communicating therewith through outlet 34 and inlet 35. Valve 33 is controlled by lever 37 which is connected to arm 38 supporting ball member 26. A connecting conduit 36 is also provided which is connected to the oil filler nipple 30 of the shock absorber.

This device operates substantially like a conventional hydro-pneumatic suspension system: as the piston is forced into the cylinder as a consequence of stress from the unsprung portion to which it is connected, the oil forced out from the upper chamber of liner 12 flows through the orifices 16 of the shock-absorbing piston 14 and, after having undergone a pressure reduction, penetrates into the annular chamber formed between the outer surface of liner 12 and the diaphragm 2 where it compresses the gas contained in chamber 3. A minor fraction of the fluid penetrates above the head 18 through the duct 19 into the clearance left between the liner 12 and piston 13. It will also be seen that the ball member 10 may oscillate freely to accommodate possible deformations of piston 13. The diametral clearance left between the piston and the liner is relatively small but nevertheless it permits the piston deformation caused by the stress applied thereto, without any detrimental frictional contact, with the tube 12, thus preventing, inter alia, journal edges from scoring the piston surface with all the detrimental consequences as to fluid-tightness. Thus, the provision of the pair of part-spherical or ball members 10 and 18 will also enable the piston 13 to behave, under the combined action of the stress transmitted from the lower end of its rod (which is equivalent at any time to a moment and a torque), as a beam pivoted at its ends and of which the neutral fibre may undergo a certain deformation. Under these conditions, the acceleration and braking efforts, the centrifugal forces developed when negotiating turns, as well as the wheel reactions due to road unevennesses, may be transmitted directly to the piston 13 acting also in the case of a direct connection between the support 25 and the wheel stub axle, as a stub-axle kingpin (FIGURE 2), the end ball member 26 being mounted on a swinging arm 38 pivoted on the frame of the vehicle.

It is clear that the present invention thus provides a device constituting an efficient and reliable substitute to the suspension, shock-absorbing and connecting members between the sprung and unsprung portions of the vehicle.

We claim:

1. A hydro-pneumatic shock absorber suspension device for interconnecting sprung and unsprung portions of vehicles, said device comprising an outer cylinder, a cylindrical diaphragm disposed in said outer cylinder and defining therewith a first chamber, a cylindrical liner disposed within said diaphragm and forming a working cylinder, said liner defining with said diaphragm a second chamber, said first chamber containing compressed gas and said second chamber containing a lubricating fluid, throttling means connecting the interior of said working cylinder with said second chamber, a piston guided in said working cylinder, at least one portion of said piston being substantially barrel-shaped and coacting with the inner surface of said liner, said outer cylinder and said piston being respectively connected to the sprung and unsprung portions of the vehicle.

2. The device of claim 1, wherein another portion of said piston projects from one end of said working cylinder, and further comprising guide means to guide the projecting portion of said piston with respect to said working cylinder.

3. The device of claim 1, further comprising a slide valve device connecting said throttling means to a high pressure source, said slide valve device being operable to adjust the ground clearance of the vehicle.

4. The device of claim 1, wherein an internal duct is formed through a portion of said piston, said duct permitting the flow of lubricating fluid between the inner surface of said liner and a portion of said piston.

5. A hydro-pneumatic shock absorber suspension device for interconnecting sprung and unsprung portions of vehicles, said device comprising an outer cylinder, a cylindrical diaphragm disposed in said outer cylinder and defining therewith a first chamber, a cylindrical liner disposed within said diaphragm and forming a working cylinder; said liner defining with said diaphragm a second chamber, said first chamber containing compressed gas and said second chamber containing a lubricating fluid; throttling means connecting the interior of said working cylinder with said second chamber; a piston guided in said working cylinder, at least one portion of said piston having a curved peripheral surface coacting with the inner surface of said liner, and another portion of said piston projecting from one end of said working cylinder and being rigid with a support connected to the wall stub axle so that the piston acts as a stub axle kingpin; and a ball member provided between the lower end of said working cylinder and the sprung portion of the vehicle to guide said projecting portion of said piston with respect to said working cylinder.

6. The device of claim 5, further comprising a plug member secured to the base of said outer cylinder, said ball member being disposed within said plug member, and further comprising means to establish fluid tightness at the base of said plug on the side opposite to said outer cylinder.

References Cited
UNITED STATES PATENTS

| | | | |
|---|---|---|---|
| 2,887,324 | 5/1959 | Jackson | 280 |
| 2,907,578 | 10/1959 | Taber | 280—112 |
| 3,216,334 | 11/1965 | Bauer | 92—160 X |
| 3,264,951 | 8/1966 | Dobrikin | 92—64 |

KENNETH H. BETTS, *Primary Examiner.*